(12) United States Patent
Gonzalez

(10) Patent No.: US 10,364,545 B2
(45) Date of Patent: Jul. 30, 2019

(54) BRACKET ASSEMBLY FOR LINKAGE ASSEMBLIES OF MACHINES

(71) Applicant: Caterpillar Inc., Peoria, IL (US)

(72) Inventor: Andres Gonzalez, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 320 days.

(21) Appl. No.: 15/349,028

(22) Filed: Nov. 11, 2016

(65) Prior Publication Data

US 2018/0135272 A1   May 17, 2018

(51) Int. Cl.
| | |
|---|---|
| *E02F 3/36* | (2006.01) |
| *E02F 9/00* | (2006.01) |
| *F16C 33/08* | (2006.01) |
| *E02F 3/32* | (2006.01) |
| *F16C 11/04* | (2006.01) |

(52) U.S. Cl.
CPC .......... *E02F 3/3613* (2013.01); *E02F 3/3636* (2013.01); *E02F 9/006* (2013.01); *F16C 33/08* (2013.01); *E02F 3/32* (2013.01); *F16C 11/045* (2013.01); *F16C 2226/72* (2013.01); *F16C 2350/26* (2013.01)

(58) Field of Classification Search
CPC .......... E02F 9/006; E02F 3/36; E02F 3/3686; Y10T 403/7005; Y10T 403/7007
See application file for complete search history.

(56) References Cited

U.S. PATENT DOCUMENTS

| | | | | |
|---|---|---|---|---|
| 2,673,751 A | * | 3/1954 | Finch ................. | F16L 37/2445 285/110 |
| 3,915,517 A | * | 10/1975 | Orefice ................ | F16C 25/02 384/271 |
| 4,487,460 A | * | 12/1984 | Becker ................ | B62D 1/16 384/620 |
| 4,756,638 A | * | 7/1988 | Neyret ................ | E05B 9/084 403/261 |
| 4,784,499 A | * | 11/1988 | Fukute ................ | F16C 33/06 384/295 |
| 4,984,958 A | | 1/1991 | Kaczmarczyk | |
| 5,135,347 A | | 8/1992 | Kaczmarczyk et al. | |

(Continued)

FOREIGN PATENT DOCUMENTS

DE   102008020330 A1 * 10/2009 ............. F16C 33/08
KR   20080008817   1/2008

*Primary Examiner* — Matthieu F Setliff
(74) *Attorney, Agent, or Firm* — Hibshman Claim Construction PLLC

(57) ABSTRACT

A bracket assembly for coupling an implement to an arm of a machine includes a bracket with a plate and a bushing. The plate includes an opening having an inner wall including a number of engagement structures arranged along an axial direction of the opening. The engagement structures are longitudinally spaced apart from each other. The bushing is adapted to be inserted and positioned into the opening. The bushing includes a cylindrical portion with an outer surface, an end, and a plurality of mating structures arranged on the outer surface, along an axial direction of the cylindrical portion. The mating structures are longitudinally spaced apart from each other. An engagement between the engagement structures and the mating structures facilitate multiple positions of the end relative to the plate.

19 Claims, 10 Drawing Sheets

(56) References Cited

U.S. PATENT DOCUMENTS

| | | | | |
|---|---|---|---|---|
| 5,544,955 | A * | 8/1996 | Wakefield | F16C 17/22 384/295 |
| 5,577,858 | A * | 11/1996 | Kasim | E02F 3/58 403/157 |
| 5,791,809 | A * | 8/1998 | Bessey | E02F 3/58 403/157 |
| 5,975,604 | A * | 11/1999 | Wolin | B66C 3/16 294/106 |
| 6,938,514 | B1 * | 9/2005 | Crane | E02F 3/3613 248/200 |
| 7,770,311 | B2 | 8/2010 | Hahnel | |
| 9,512,875 | B2 * | 12/2016 | Griewenka | F16C 23/02 |
| 9,534,624 | B2 * | 1/2017 | Rautionmaa | E02F 3/3613 |
| 10,030,693 | B2 * | 7/2018 | Stolz | E02F 3/48 |
| 2010/0181760 | A1 | 7/2010 | Duquette et al. | |
| 2015/0219135 | A1 * | 8/2015 | Rautionmaa | E02F 3/3613 411/172 |
| 2015/0337897 | A1 * | 11/2015 | Griewenka | F16C 23/02 384/255 |
| 2016/0348712 | A1 * | 12/2016 | Stolz | E02F 3/48 |
| 2018/0135271 | A1 * | 5/2018 | Gonzalez | E02F 3/3604 |

\* cited by examiner

BRACKET ASSEMBLY FOR LINKAGE ASSEMBLIES OF MACHINES

TECHNICAL FIELD

The present disclosure relates to a bracket assembly for coupling an arm of a machine to an implement. More particularly, the present disclosure relates to a bracket assembly having a bushing to facilitate attachment of different arms to an implement.

BACKGROUND

Machines, such as an excavator, generally include a linkage assembly and an implement coupled to the linkage assembly to perform useful work. Typically, a bracket assembly is used to mount the implement to the linkage assembly. On occasions, the implement may be required for use on different machines, and each such different machine may have linkage assemblies of a different size and specification. To enable an attachment of the implement to such linkage assemblies, different bracket assemblies, or bracket assemblies with differently sized bushings, may be required. As a result, a large number of bracket assemblies or differently sized bushings may need to be stocked by operators or service technicians for using the implement with different machines. Such a practice increases costs, effort, and overhead.

U.S. Pat. No. 4,984,958 relates to a quick attachment holder for connecting an attachment to boom arms of a loader. The quick attachment holder includes right-hand and left-hand end portions connected by a semi-rigid cross tube. A pin connection of the holder end portions to the tube causes the left-hand and right-hand end portions to generally move together while permitting several degrees of relative rotational movement between end portions to aid in the reconnection of the attachment even when there is slight misalignment between the holder and the attachment.

SUMMARY OF THE INVENTION

In one aspect, the disclosure is directed towards a bracket assembly for coupling an implement to an arm of a machine. The bracket assembly includes a bracket and a bushing. The bracket includes a plate with an opening having an inner wall. The inner wall includes multiple engagement structures arranged along an axial direction of the opening, and the multiple engagement structures are longitudinally spaced apart from each other. The bushing is adapted to be inserted and positioned into the opening. The bushing has a cylindrical portion with an outer surface and an end. A plurality of mating structures arranged on the outer surface, along an axial direction of the cylindrical portion, and which are longitudinally spaced apart from each other. An engagement between the engagement structures and the mating structures facilitates multiple positions of the end relative to the plate.

In another aspect, the disclosure relates to a linkage assembly for a machine. The linkage assembly includes an arm, a bracket, a bushing, and a pin. The bracket is pivotally coupled to the arm, and is configured to couple an implement to the arm. The bracket includes a base structure and a plate. The base structure is configured to couple to the implement, while the plate has an opening having an inner wall. The inner wall includes a number of engagement structures that are arranged along an axial direction of the opening. The engagement structures are longitudinally spaced apart from each other. The bushing is adapted to be inserted and positioned into the opening. The bushing includes a cylindrical portion with an outer surface and an end. A plurality of mating structures is arranged on the outer surface, along an axial direction of the cylindrical portion, and are longitudinally spaced apart from each other. An engagement between the engagement structures and the mating structures facilitates multiple positions of the end relative to the plate. The pin is inserted through the opening and couples the arm with the bracket.

DETAILED DESCRIPTION

Figure 1:
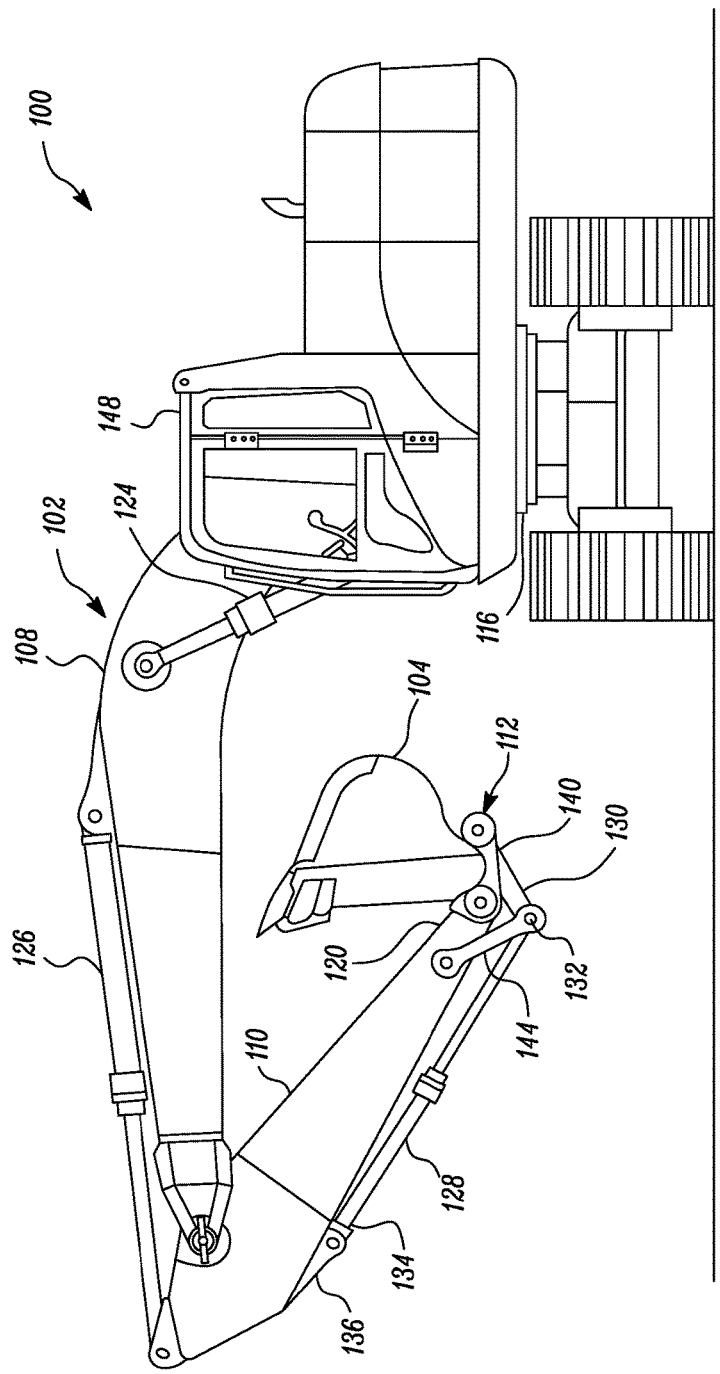
FIG. 1 is an exemplary machine having a linkage assembly, in accordance with the concepts of the present disclosure.

Referring to FIG. 1, a machine 100 is shown. The machine 100 may be configured to perform various operations at a worksite, including loading, unloading, and the like. The machine 100 is depicted as an excavator, including a linkage assembly 102 for manipulating an implement 104. However, the machine 100 is not limited to being an excavator, and similar other work machines may be contemplated. For example, the machine 100 may also represent a forest machine, a loader, or any other similar type of work machine that may use any of the other widely available linkages or arms of the art. The implement 104 may be a bucket. However, the implement 104 may also represent and/or include a grapple, a ram, a fork, a thumb, and similar such work units, that are configured to perform different operations on different work materials at different worksites. Work materials may include, but are not limited to, boulders, pipes, trees, structural components, various disintegrated particles, soil, and the like.

The linkage assembly 102 may include one or more arms (108, 110), and a bracket assembly 112 configured to couple the implement 104 to the one or more arms (108, 110). The arms (108, 110) may be categorized into and include one or both of a boom 108 and a stick 110. The boom 108 may be coupled to a frame 116 of the machine 100, while the stick 110 may be pivotally coupled to the boom 108, in a known manner. An end 120 of the stick 110 may be pivotally coupled to the implement 104 via the bracket assembly 112. Although the boom 108 and the stick 110 have been disclosed, it is possible for the linkage assembly 102 to include more or lesser number of arms.

Figure 2:
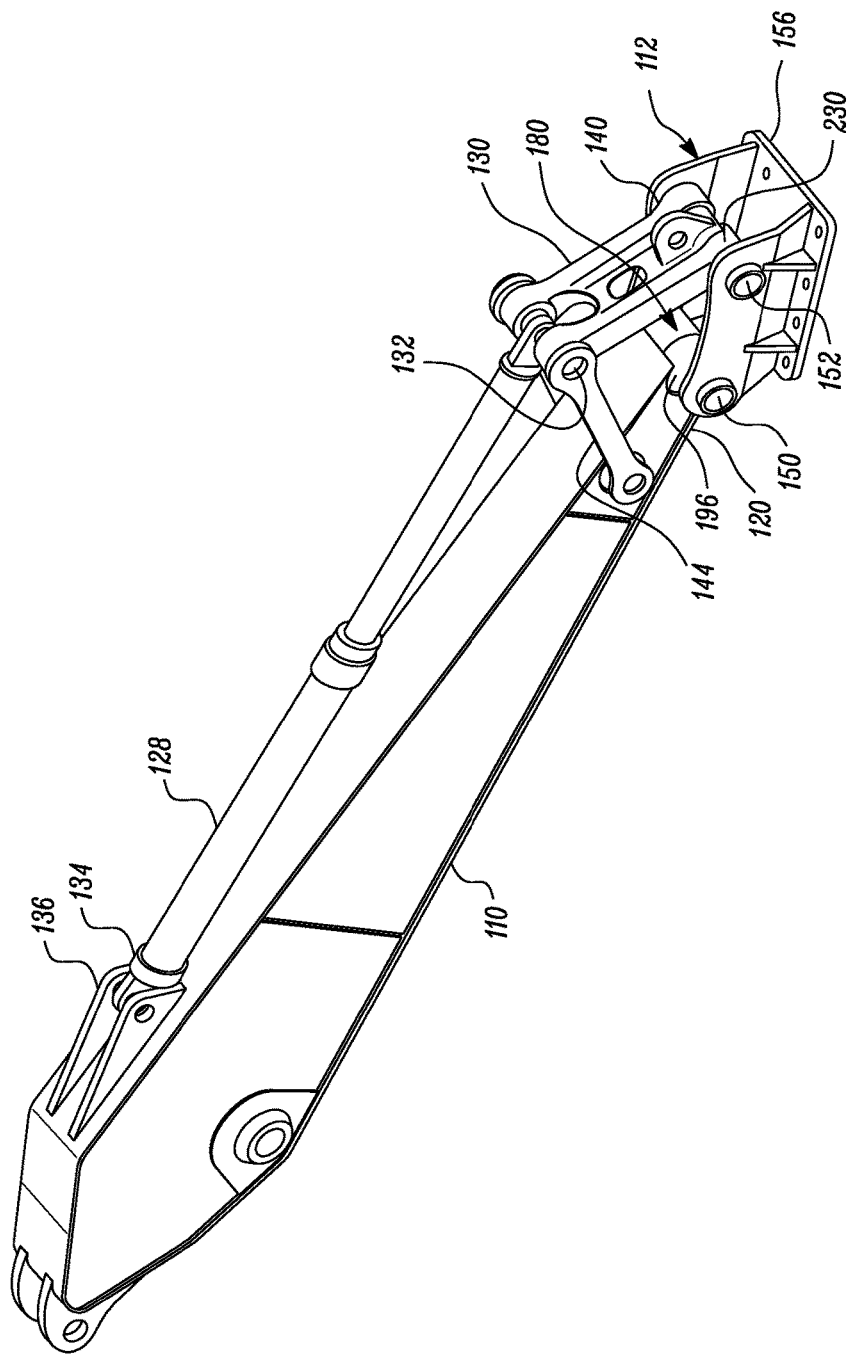
FIG. 2 is a stick of the linkage assembly depicted in conjunction with a bracket assembly of the linkage assembly, in accordance with the concepts of the present disclosure.

Referring to FIGS. 1 and 2, one or more boom lift actuators 124 may be operably and pivotally coupled to the boom 108 and the machine 100 (such as to the frame 116 of the machine 100). In that manner, the boom lift actuators 124 may facilitate an actuation and rotation of the boom 108 with respect to the machine 100. Such a rotation helps to raise and lower the linkage assembly 102, as a whole. Similarly, a stick extension actuator 126 is operably coupled to the boom 108 and the stick 110 to rotate the stick 110 with respect to the boom 108. Further, the linkage assembly 102 may include an implement articulation actuator 128 and an attachment member 130 that are pivotally coupled to each other at a common point 132 of rotation. One end 134 of the implement articulation actuator 128 may be pivotally coupled to a portion 136 of the stick 110, while an end 140 of the attachment member 130 may be pivotally coupled to the implement 104 (via the bracket assembly 112). A link rod 144 may be coupled between the stick 110 and the common point 132 so that an actuation of the implement articulation actuator 128 may cause the implement 104 to execute a pivotal movement relative to the stick 110. Each of the above noted actuators 124, 128, 128 may be or include hydraulic actuators that are actuated by use of a hydraulic fluid. To this end, one or more operators may be stationed within an operator cab 148 of the machine 100 to use one or more levers and/or known input devices (not shown) to actuate the actuators 124, 126, 128. Reference will now be made in detail to specific embodiments or features, examples of which are illustrated in the accompanying drawings. Wherever possible, the same reference numbers will be used throughout the drawings to refer to the same or the like parts.

Figure 3:
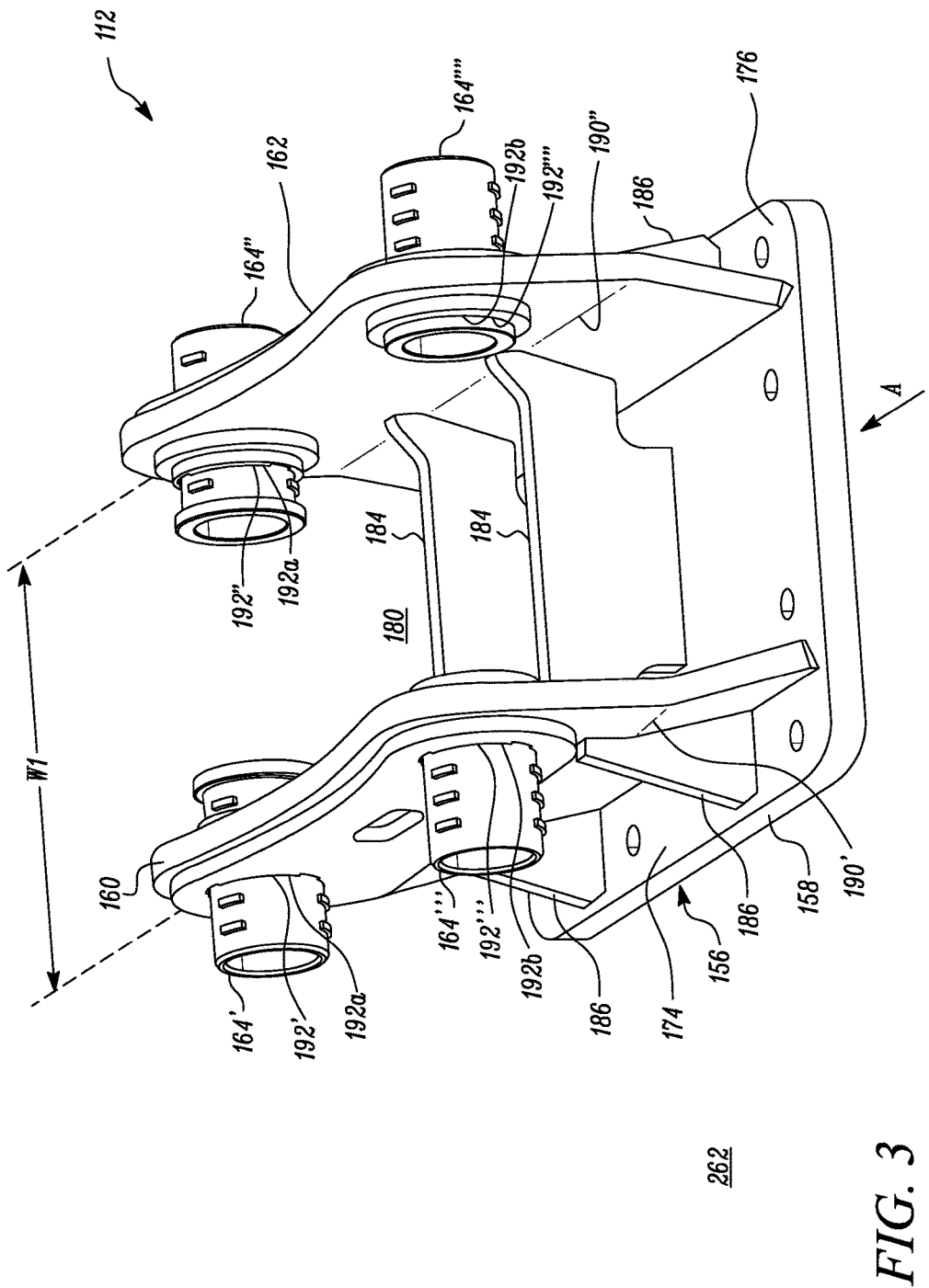
FIG. 3 is an assembled view of the bracket assembly depicted with certain surrounding components removed, in accordance with the concepts of the present disclosure.
Figure 4:
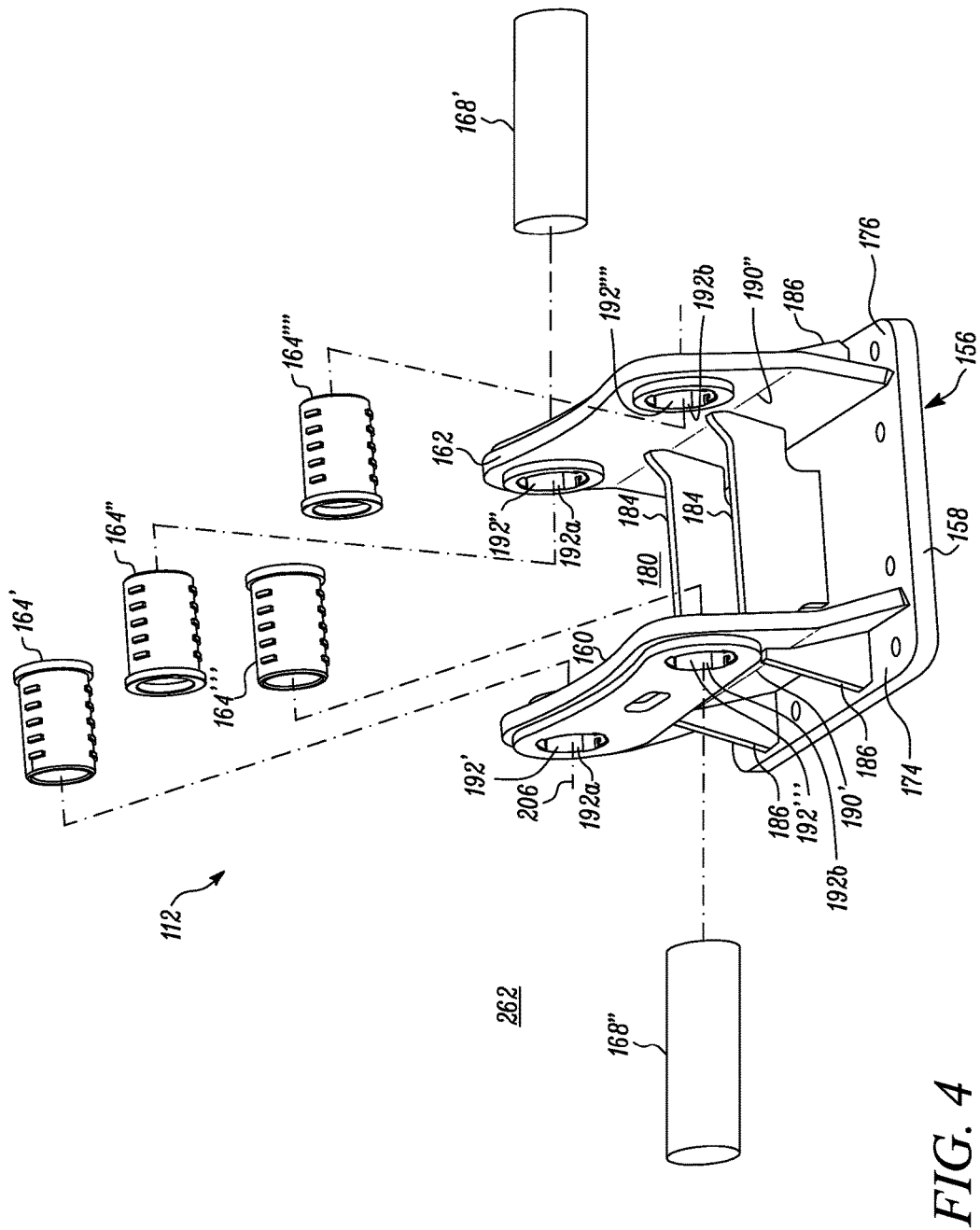
FIG. 4 is an exploded view of the bracket assembly, in accordance with the concepts of the present disclosure.

Referring to FIGS. 2, 3, and 4, the bracket assembly 112 is discussed. The bracket assembly 112 facilitates a coupling of the implement 104 with the stick 110, and also with different such arms of different machines. The bracket assembly 112, as a whole, is pivotally coupled to the end 120 of the stick 110 of the linkage assembly 102 at a first pivotal connection 150, and is also pivotally coupled relative to the attachment member 130 at a second pivotal connection 152. The first pivotal connection 150 of the bracket assembly 112 facilitates a rotation between the stick 110 and the implement 104, while the second pivotal connection 152 facilitates a rotation between the attachment member 130 and the implement 104. Further, as a whole, the bracket assembly 112 is fixedly connected to the implement 104 (see FIG. 1) via threaded fasteners, for example.

The bracket assembly 112 includes a bracket 156 having a base structure (or a base plate 158) and one or more side plates 160, 162. Further, the bracket assembly 112 includes one or more bushings 164 (exemplarily four in number— 164', 164'', 164''', 164''''), and a couple of pins 168 (or pivot pins 168—exemplarily two in number—168', 168'', see FIG. 4), an arrangement of which is set out below.

The side plates 160, 162 are exemplarily two in number— i.e. including a first side plate 160 and a second side plate 162. Although not limited, each of the plates 160, 162 are substantially planarly formed components. The base plate 158 is configured to be coupled to the implement 104 via threaded fasteners (not shown), and may include a first edge portion 174 and a second edge portion 176. The first side plate 160 may be coupled to the base plate 158 at the first edge portion 174, while the second side plate may 162 be coupled to the base plate 158 at the second edge portion 176. In an embodiment, the first side plate 160 and the second side plate 162 are parallel and spaced apart from each other when they are respectively coupled to the first edge portion 174 and the second edge portion 176. Both the first side plate 160 and the second side plate 162 may be perpendicular to the base plate 158, and in so doing, an arrangement of the side plates 160, 162 and the base plate 158 impart a substantial box-like cross-section to the bracket 156 when viewed in a direction defined along the edge portions 174, 176 (see direction, A). Further, an inner space 180 is defined between the first side plate 160 and the second side plate 162.

As shown in the depicted embodiment, the bracket 156 may also include a number of reinforcement structures (or reinforcement members 184) and a number of ribs 186. For example, two reinforcement members 184 are coupled in between the first side plate 160 and the second side plate 162, although more or less reinforcement members 184 are possible. The reinforcement members 184 may also be connected to the base plate 158, thus inflexibly connecting the plates 160, 162 to each other. Further, the ribs 186 may be applied to strengthen connections between the side plates 160, 162 and the base plate 158, in a known manner. As shown, the side plates 160, 162 include a fold line 190', 190'' provided substantially parallely along a length of each of the side plates, i.e. in a direction (see direction, A) defined by first edge portion 174 and the second edge portion 176, respectively, and which is provided for structural rigidity. In some implementations, a coupling between each of the side plates 160, 162, the base plate 158, the reinforcement members 184, and the ribs 186, is attained by welding. It may be contemplated, however, that such a coupling may be attained by various other known methods.

The first side plate 160 includes a first opening 192' and the second side plate 162 includes a second opening 192''. The first opening 192' is aligned to the second opening 192'', defining a first pair of aligned openings 192a of the bracket 156. Similarly, first side plate 160 includes a third opening 192''' and the second side plate 162 includes a fourth opening 192''''. The third opening 192''' is aligned to the fourth opening 192'''', defining a second pair of aligned openings 192b of the bracket 156.

Each of the pivot pins 168', 168'' may be solid cylindrical shafts, adapted to couple the arm (stick 110) with the bracket 156. A first pivot pin 168' among the pivot pins 168', 168'' may be inserted through the first pair of aligned openings 192a, and in turn be engaged to a pin receiving portion 196 (FIG. 2) of the end 120 of the stick 110 that is extended into the inner space 180. In so doing, the first pivot pin 168' couples the side plates 160, 162, and in turn the bracket 156, to the end 120 of the stick 110—forming the first pivotal connection 150. Similarly, a second pivot pin 168'' among the pivot pins 168', 168'' may be inserted through the second pair of aligned openings 192b to couple the bracket 156 to the attachment member 130—forming the second pivotal connection 152.

The bushings 164, which may be exemplarily four in number, as already noted, and may include and be categorized into a first bushing 164', a second bushing 164'', a third bushing 164''', and a fourth bushing 164''''. The first bushing 164' may be configured to be inserted and positioned into the first opening 192'; the second bushing 164'' may be configured to be inserted and positioned into the second opening 192''; the third bushing 164''' may be configured to be inserted and positioned into the third opening 192'''; and the fourth bushing 164'''' may be configured to be inserted and positioned into the fourth opening 192''''. The first bushing 164' may form an interface between the first opening 192' and the first pivot pin 168'; the second bushing 164'' may form an interface between the second opening 192'' and the first pivot pin 168'; the third bushing 164''' may form an interface between the third opening 192''' and the second pivot pin 168''; and the fourth bushing 164'''' may form an interface between the fourth opening 192'''' and the second pivot pin 168''. Further description set out below may include discussions pertaining to an assembly between the first bushing 164', the first opening 192', and the first pivot pin 168' alone. However, aspects of those discussions may be equivalently applied to an assembly between the second bushing 164'', the second opening 192'', and the first pivot pin 168'; an assembly between the third bushing 164''', the third opening 192''', and the second pivot pin 168''; and an assembly between the fourth bushing 164'''', the fourth opening 192'''', and the second pivot pin 168''. For ease in reference and understanding, the first bushing 164' may be simply referred to as a bushing 164, and similarly, the first opening 192' may be referred to as opening 192, and the first pivot pin 168' may be referred to as pivot pin 168. Additionally, the first side plate 160 may also be solely referred to as a plate 160. Details of the bushing 164 may be applicable to each of the bushings 164', 164'', 164''', 164''''.

Figure 5:
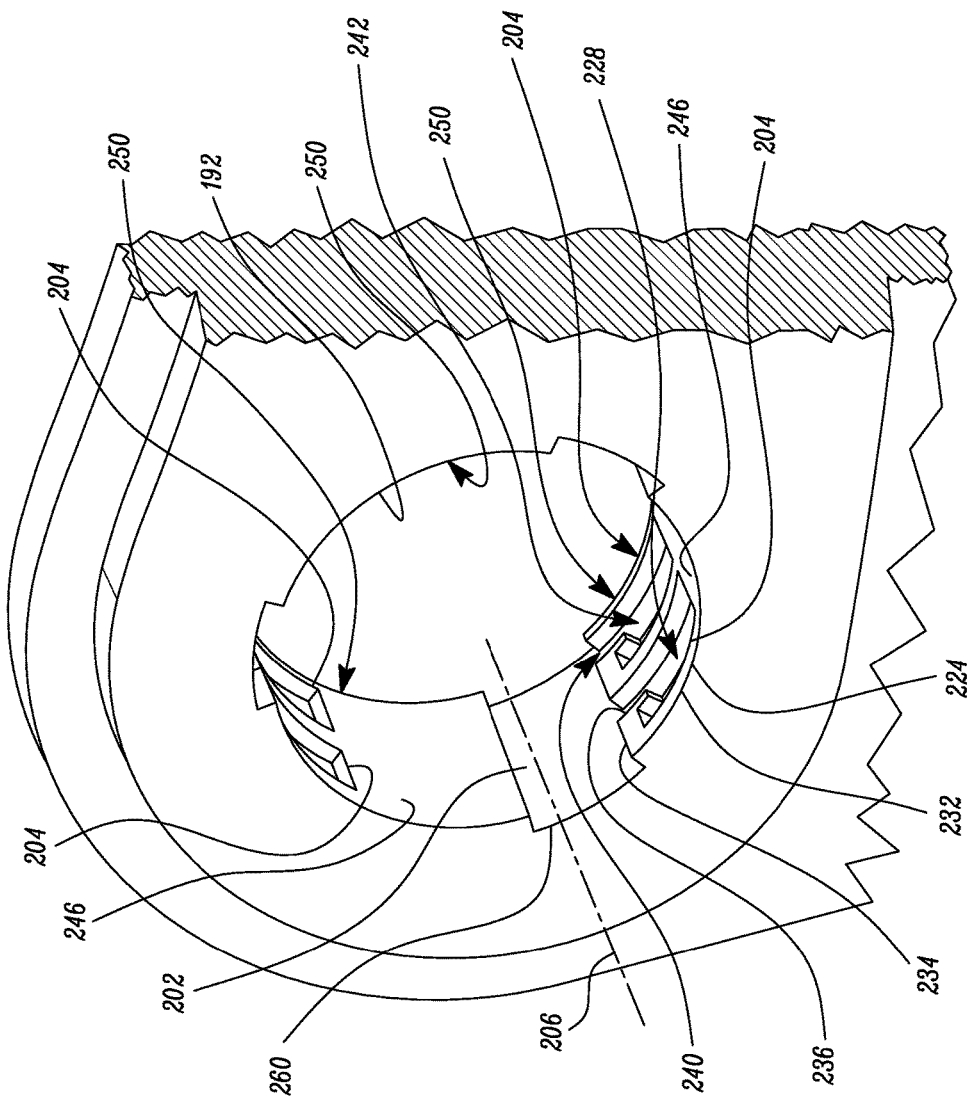
FIG. 5 is a bushing of the bracket assembly, in accordance with the concepts of the present disclosure.

Referring to FIG. 5, the opening 192 may be circular in shape to accommodate the bushing 164. The opening 192 may include an inner wall 202 having a number of engagement structures 204. In some implementations, the engagement structures 204 are arranged along an axial direction of the inner wall 202 of the opening 192. For example, the opening 192 defines an axis 206, and each engagement structure, among the engagement structures 204, are arranged on the inner wall 202 of the opening 192, along an axial direction defined by the axis 206. Further, the engagement structures 204 are longitudinally spaced apart from each other, as well. In an embodiment, the engagement structures 204 are protrusions formed on the inner wall 202 of the opening 192.

Figure 6:
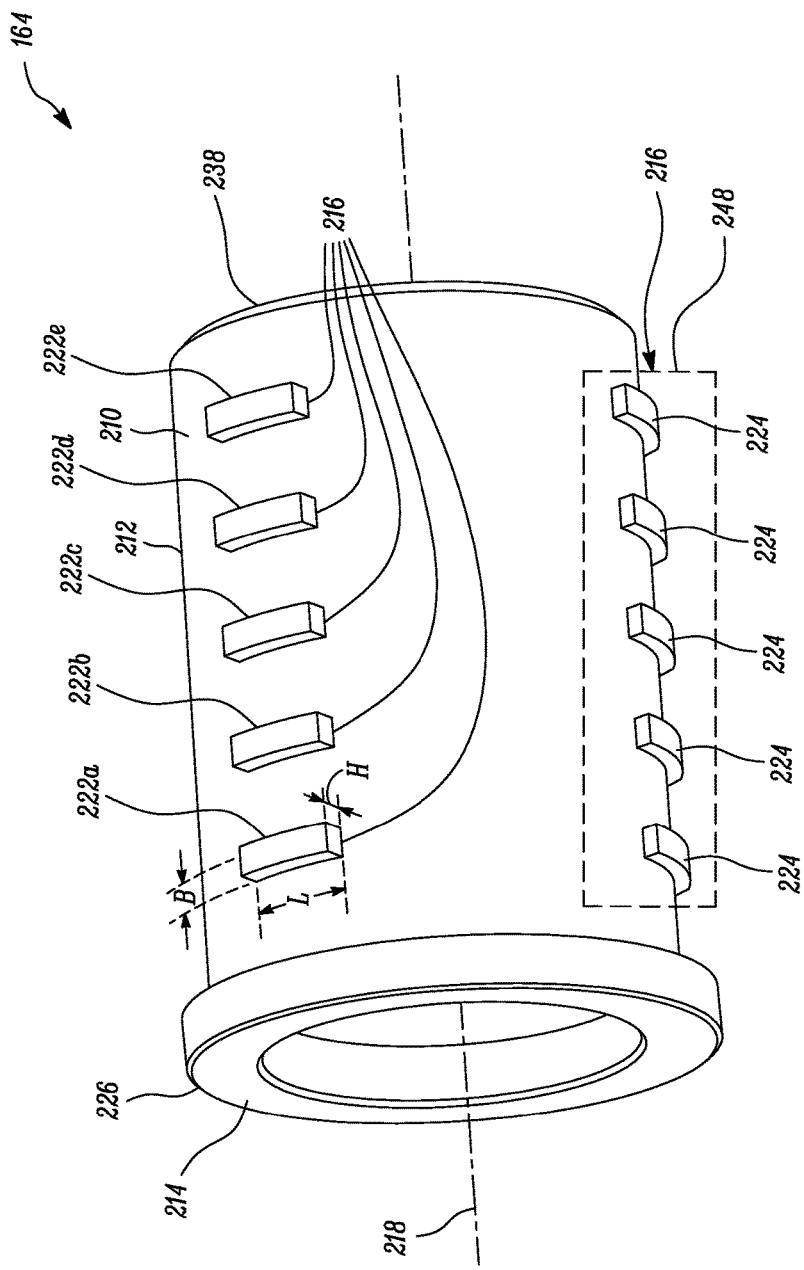
FIG. 6 is an enlarged view of an inner wall of an opening of a bracket of the bracket assembly, with certain structural details depicted, in accordance with the concepts of the present disclosure.

Referring to FIG. 6, the bushing 164 includes a substantially cylindrical structure with a cylindrical portion 210, an outer surface 212 on the cylindrical portion 210, and an end 214. Further, the bushing 164 includes a lip portion 226 that extends radially outwardly from the end 214. The lip portion 226 may be structured as a flange that, in some implementations, is adapted to abut against the plate 160 and restrict an axial movement of the bushing 164 relative to the plate 160 towards an outer space 262 (see direction C-C', FIGS. 8A, 8B, and 8C, with FIG. 7C depicting an outermost position of the bushings 164', 164'' relative to the plates 160, 162, respectively). The bushing 164 is adapted to be inserted and positioned into the opening 192. A number of mating structures 216 is arranged on the outer surface 212, along an axial direction of the cylindrical portion 210. As with the engagement structures 204, the mating structures 216 are longitudinally spaced apart from each other as well. In an embodiment, each mating structure, among the mating structures 216, are or include longitudinal protrusions, or simply protrusions 222, that are substantially rectangular shaped, extending radially outwardly from the outer surface 212. More particularly, a length, L, of each protrusion, among the protrusions 222, is aligned along a curvature defined by a circumference of the outer surface 212 of the cylindrical portion 210; a breadth, B, of each protrusion is aligned along an axial direction defined by an axis 218 of the bushing 164; and a height, H, of each protrusion is generally radially extended outwards of the outer surface 212. In some implementations, the protrusions 222 may be five in number—namely a first protrusion 222a, a second protrusion 222b, a third protrusion 222c, a fourth protrusion 222d, and a fifth protrusion 222e.

Figure 7:
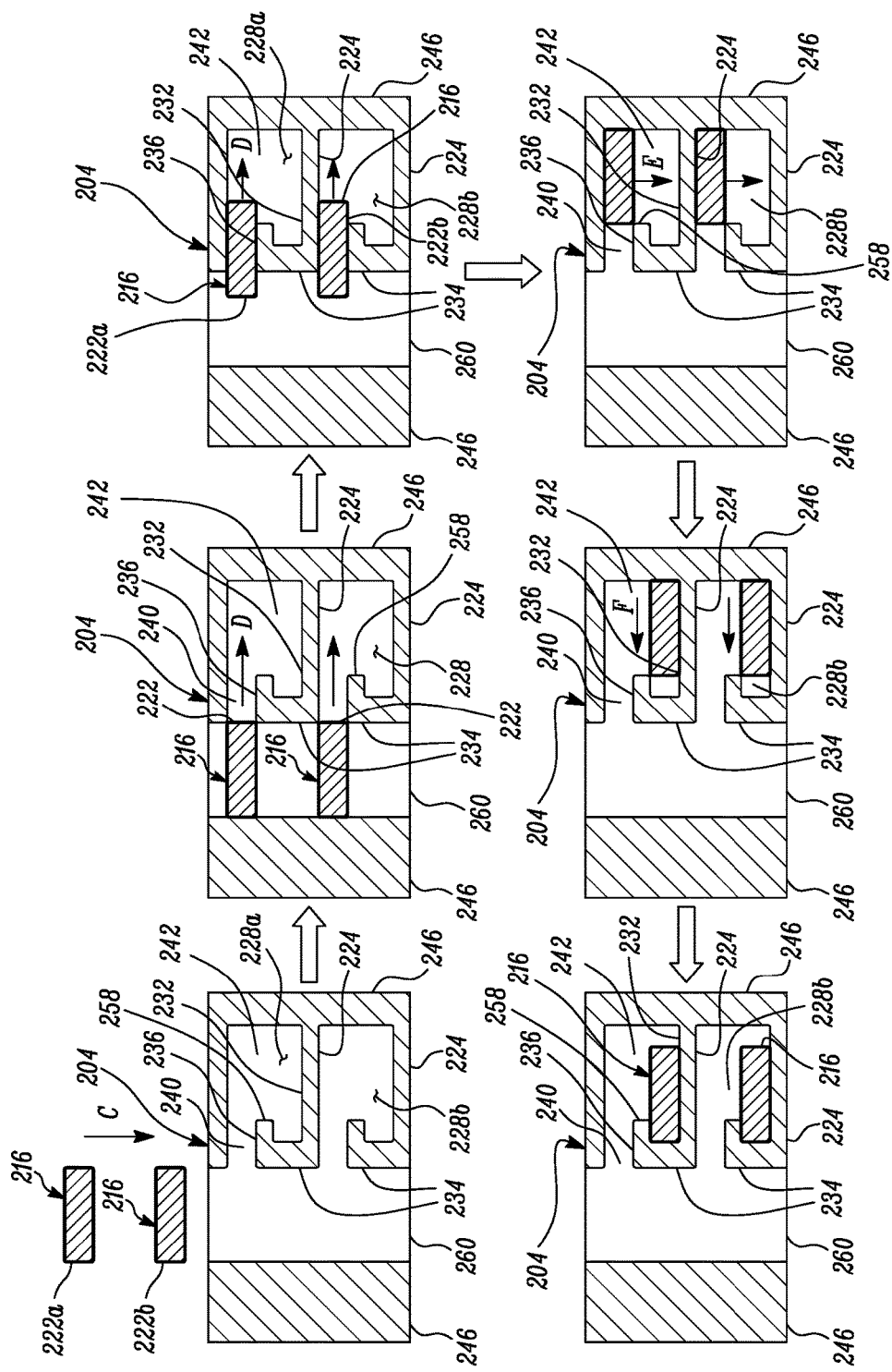
FIG. 7 is a schematic representation of a sequence of engaging a number of engagement structures of the inner wall and a number of mating structures of the bushing, in accordance with the concepts of the present disclosure.

Referring to FIGS. 5, 6 and 7, a profile and arrangement of the engagement structures 204 relative to the mating structures 216 is discussed. In some implementations, the engagement structures 204 of the opening 192 also include protrusions, but which are J-shaped—referred to as J-shaped protrusion 224. Each such J-shaped protrusion 224 may define a cavity 228 to receive one or more mating structures 216 (or protrusions 222 of the mating structures 216). For example, each engagement structure 204 (or as J-shaped protrusion 224 of the engagement structures 204) may include a first wall 232, a second wall 234 substantially perpendicular to the first wall 232, and a lip 236 that extends from the second wall 234, and which is substantially parallel to the first wall 232. The lip 236 may be smaller in length relative to the first wall 232. The first wall 232, second wall 234, and the lip 236, together define the cavity 228. Further, an inlet passage, referred to as a first inlet passage 240 (shown on an alternate as J-shaped protrusion 224 for clarity), may be defined between every successive engagement structures 204, so as to receive the mating structures 216 (or the protrusions 222 of the mating structures 216) into each cavity 228 defined by the engagement structures 204. In some implementations, there are two cavities 228a and 228b defined within the opening 192 (see FIGS. 8A, 8B, and 8C). The first inlet passage 240 may be generally longitudinally defined along a radial direction of the opening 192, but following a curvature of the inner wall 202. In an example, a successive J-shaped protrusion 224 (engagement structure 204) may be spaced apart from a preceding J-shaped protrusion 224 (engagement structure 204), and each J-shaped protrusion 224 may be structured such that the lip 236 of a preceding J-shaped protrusion 224 may be relatively closer to a first wall 232 of a succeeding J-shaped protrusion 224 (as compared to a distance between the first walls 232 of the preceding and succeeding J-shaped protrusions 224). The first inlet passage 240 may be defined between the lip 236 of the preceding J-shaped protrusion 224 and the first wall 232 of the succeeding J-shaped protrusion 224. In effect, an engagement between the J-shaped protrusions 224 (engagement structures 204) and one or more of the protrusions 222 (mating structures 216) facilitates multiple positions of the end 214 relative to the plate 160. The multiple positions of the end 214 relative to the plate 160 correspond to a variation of a distance between the end 214 and the plate 160, measured along the axis 206 of the opening 192.

In structure, the first wall 232 may extend from a base wall 246 along a curvature defined by a circumference of the inner wall 202 of the opening 192, perpendicular to the axial direction of the opening. Given that the lip 236 is parallel to the first wall 232, the lip 236 may also extend from the second wall 234 along the curvature defined by a circumference of the inner wall 202. Since the lip 236 is smaller in length relative to the first wall 232, the lip 236 stops way ahead of the base wall 246, thus defining a second inlet passage 242 between the lip 236 and the base wall 246. The second inlet passage 242 is defined along an axial direction (axis 206) that facilitates a protrusion of one or more of the protrusions 222 (mating structures 216) to be inserted into the cavity 228. When the bushing 164 is assembled to the opening 192, the lip 236 also helps in retaining the bushing 164 within the opening 192 by locking a position of each engaged protrusion of the protrusions 222 (mating structures 216) within the cavity 228. In an embodiment, each such engaged protrusion may be locked and held retentively within the cavity 228 against a rotation by a magnetic force provided within one or more surfaces that define the cavity 228, for example.

Further, an engagement structure series 250 may be defined by the number of engagement structures 204 defined from a start 252 of the opening 192 (i.e. from an inner space 180 of the bracket 156) to an end 254 of the opening 192 (i.e. towards the outer space 262 of the plate 160), along the axis 206. In some implementations, a series of each second walls 234 of the engagement structures 204 may be longitudinally aligned along the axial direction (axis 206) of the opening 192 and be parallel to the axis 206, thereby forming an intermittent, substantially linear array of walls extending from the start 252 of the opening 192 to the end 254 of the opening 192. In an embodiment, the inner wall 202 of the opening 192 may include three such engagement structure series 250 that is successively structured and arranged at an exemplary angular offset of 120 degrees relative to a preceding engagement structure series 250, along a curvature defined by the circumference of the inner wall 202. Given such a configuration, a groove 260 is defined in between a preceding engagement structure series 250 and a successive engagement structure series 250. More specifically, the groove 260 is defined between the intermittent, substantially linear array of second walls 234 and the base wall 246 of a successive engagement structure series 250. In some implementations, the groove 260 includes a width that may match against a width of each protrusion, of the protrusions 222 of the mating structures 216. Given three engagement structure series 250, a number of groove 260 may also be exemplarily three. It may be seen from the drawings (FIG. 5), that only a single J-shaped protrusion 224 is mostly annotated for clarity and understanding. It will be understood that these references may be envisioned for the entire group of the J-shaped protrusion 224 (or engagement structure series 250) of engagement structures 204 structured on the inner wall 202.

Given the 120 degrees' angular offset of the engagement structure series 250, the protrusions 222 of the mating structures 216 may also be categorized into a series that may be exemplarily three in number. For example, a series defined by a column of protrusions 222 along the axial direction (axis 218) may be referred to as protrusion series 248 (see FIG. 6), and the protrusion series 248 may also be successively structured and arranged at an angular offset of 120 degrees relative to a preceding protrusion series 248, along a curvature defined by the circumference of the outer surface 212.

Although a number of the engagement structure series 250 and the protrusion series 248 is disclosed as three, more or lesser numbers may be contemplated, and such an example involving a three number series for both the protrusion series 248 and the engagement structure series 250 need not be seen as being limited in any way. Further, the number of protrusions 222 and the engagement structures 204, and thus the inlet passages (such as first inlet passage 240) and the cavity 228, may vary and differ from application to application, and may not be limited to what has been disclosed in the present disclosure. Moreover, an arrangement of the second bushing 164" relative to the second side plate 162 may remain similar as has been described above. Similarly, an arrangement of the bushings 164''', 164'''' may remain similar as well, respectively to the openings 192''', 192'''' of the plates 160, 162.

INDUSTRIAL APPLICABILITY

As the machine 100 operates over a worksite, for a period, it may happen that the implement 104 may require to be removed from the machine 100 and be assembled to another machine. Such a situation may arise because of machine downtime, machine maintenance, or because of an availability of another machine that is better equipped to handle an operation related to the implement 104. In some cases, it may also happen that the same machine 100 is required to be equipped with another implement, such as implement 104, since one type of operation performed by the implement 104 may come to an end, while another type of operation may need to start. During a transfer or a changeover of the implement 104 from a first machine to the machine 100, for example, it may happen that a width of the end 120 of the arm (or stick 110) may be unable to comply with a distance, such as distance $W_1$ (FIG. 3) existing between plates 160, 162. In some cases, it may happen that the width of the end 120 is much lesser than the distance $W_1$ (FIG. 3), and if the end 120 were still assembled with the bracket assembly 112, gaps may exist between the end 120 of the stick 110 and the bracket assembly 112, leading to increased chances of component play and consequent component damage. Since it is preferred for high productivity work cycles to avoid such situations, and also because there is a desire to lessen time and effort during such implement or machine changeovers, the bushing 164 of the present disclosure is applied to the bracket assembly 112.

Figure 8A:
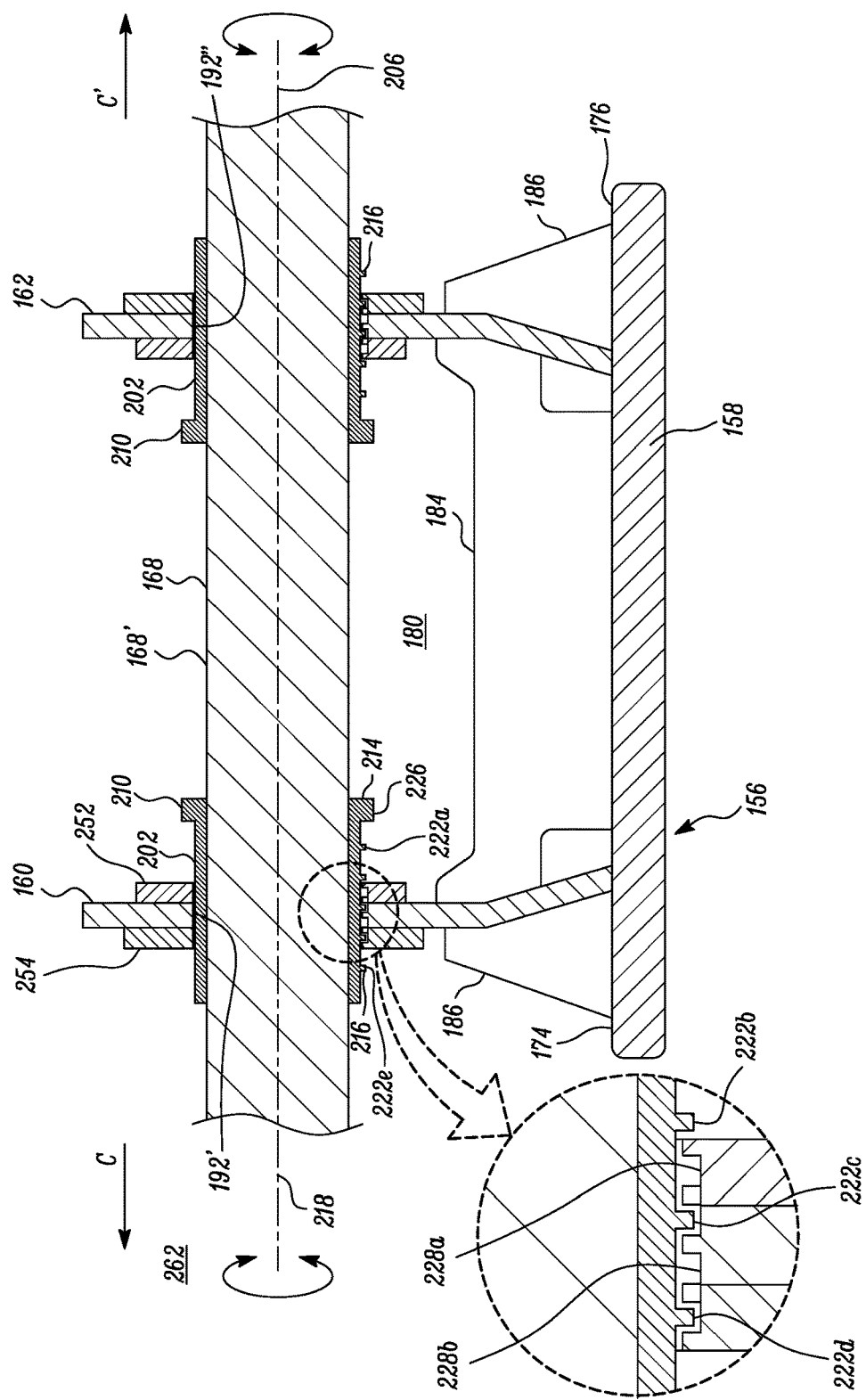
FIGS. 8A, 8B, and 8C are depictions of various positions of the bushings relative to the bracket assembly, in accordance with the concepts of the present disclosure.
Figure 8B:
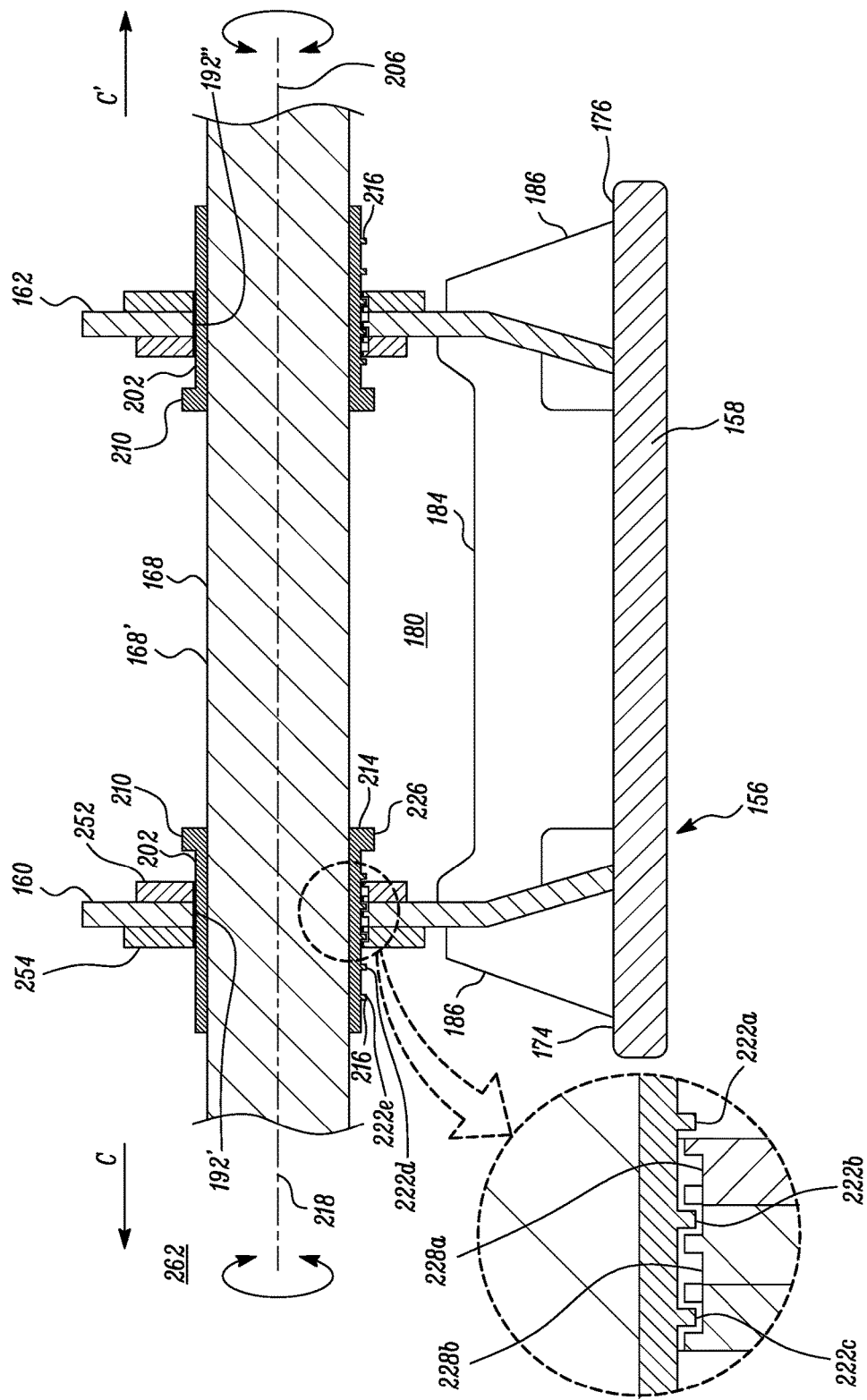
Figure 8C:
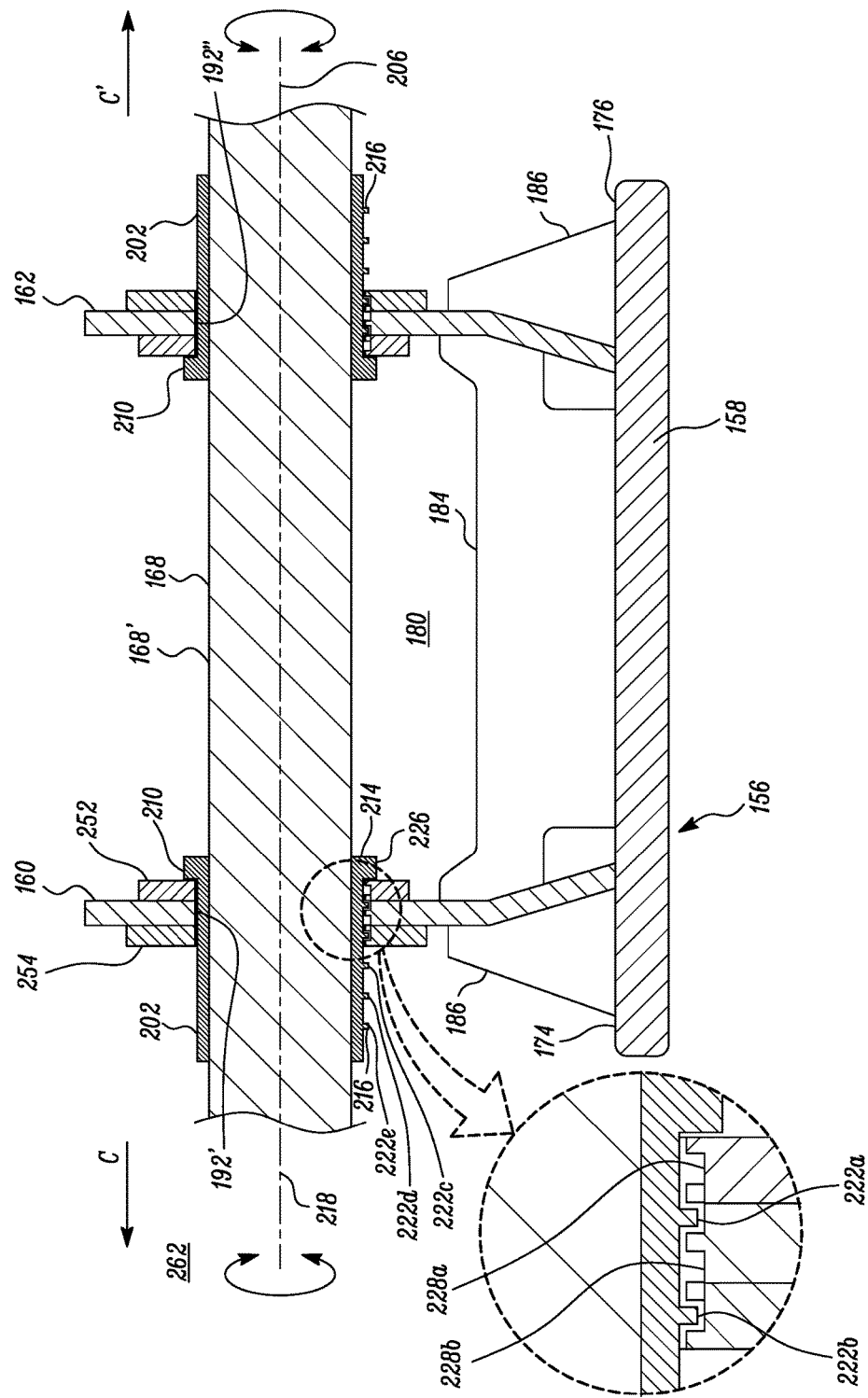

Referring to FIGS. 8A, 8B, 8C, an exemplary changeover condition is discussed in an exemplary first machine. This first machine may include the implement 104, provided with the bracket assembly 112. If the first machine were to change and the implement 104 were to be transferred to a new machine, such as machine 100, an operator may first unfasten one or more fastener pins (not shown) that may couple the pivot pins 168' to the bracket assembly 112 in a known way. Thereafter, the operator may pull out the pivot pins 168', 168" from the bracket 156 by any conventional method, such as by hammering against one end of the pivot pins 168', 168" and drawing the pivot pins 168', 168" from the other end. By freeing the bracket 156 of the pivot pins 168', 168" in such a manner, an end of the stick of the exemplary first machine may be removed from the bracket assembly 112. Next, the operator may cause the end 120 of the stick 110 of the new machine, such as the machine 100, to be extended into the inner space 180. As the pin receiving portion 196 of the end 120 of the stick 110 and a pin receptor 230 (see FIG. 2) at the end 140 of the attachment member 130 is respectively brought into alignment with the first pair of aligned openings 192a and second pair of aligned openings 192b, the operator may gauge any difference in a width of the ends 120, 140 relative to the respective distances between the first pair of aligned openings 192a and the second pair of aligned openings 192b.

Referring to FIGS. 7, 8A, 8B, and 8C, according to the width gauged, the operator may insert the bushings 164', 164", 164''', 164''' respectively into each of the openings 192', 192", 192''', 192'''' and opt for a bushing position that complies with the distances between each of the aligned openings 192a, 192b and the ends 120, 140, respectively. The opted position may help clear or mitigate any possibility of gaps between the end 120 of the stick 110 and the bracket assembly 112. However, if the bushings 164', 164", 164''', 164''' were already present in the bracket 156, the operator may need to only reposition an originally held alignment of the bushing 164 to a new alignment, depending upon the widths of the ends 120, 140. In an example, if a wider stick end 120 needs to be assembled, and it were noticed that a protrusion (such as the fourth protrusion 222d), farther to the end 214, were originally engaged with the cavity 228b (FIG. 8A), the operator may move the bushing 164 (in a direction, C, i.e. away from the inner space 180 and towards the outer space 262) such that another protrusion, such as the second protrusion 222b engages with cavity 228b (FIG. 8C). An intermediate position as shown in FIG. 8B may also be contemplated if required. In an embodiment, such a re-positioning may be performed even for the second bushing 164" relative to the second opening 192", as well. By re-positioning the bushings 164', 164", a distance between the lip portions 226 of the two bushings 164', 164" may increase, allowing the wider stick end 120 to be accommodated into the inner space 180, between the first pair of aligned openings 192a (and the lip portions 226). Thereafter, the operator may assess whether a similar re-positioning needs to be performed between the third bushing 164''' and the fourth bushing 164'''' as well, and such may be performed depending upon a width of the attachment member 130. Once appropriately re-aligned and re-positioned, the ends 120, 140 of the stick 110 and the attachment member 130 may be brought into the inner space 180, between the aligned openings 192a, 192b, the pivot pins 168 pushed into the respective pair of aligned openings 192a, 192b, and subsequently, the machine 100 (with the implement 104) may be prepared for a next level operation, or a continued operation.

Referring to FIG. 7, an exemplary assembling scheme and positioning process of the bushing 164 relative to the opening 192 is discussed. FIG. 7 is a schematic representation of the process, depicting six exemplary levels of engagement of the bushing 164 relative to the opening 192. During assembly, an operator may bring forth an opposite end 238 of the bushing 164 and insert the opposite end 238 into the opening 192. The insertion may be such that one of the protrusion series 248 of the bushing 164 may first enter into one of the groove 260. Thereafter, upon a protrusion (such as second protrusion 222b) reaching a desired distance into the opening 192, the operator may select a first inlet passage 240 of any of the engagement structures 204, such as having the cavity 228b, and insert the second protrusion 222b therein, by twisting the bushing 164 in a clock wise direction (direction, D), for example. Thereafter, once the second protrusion 222b is inserted into the first inlet passage 240, the operator may continue the clock wise rotation till the second protrusion 222b is flush with an edge 258 of the lip 236 and abuts against the base wall 246, at the second inlet passage 242. Once the second protrusion 222b has reached the second inlet passage 242, the operator may push the bushing 164 in an axial direction (axis 206, or direction, F) of the opening 192 and force the second protrusion 222b into the cavity 228b. Next, the operator may twist the bushing 164 in a counter clockwise direction (direction, F) such that a portion of the second protrusion 222b snaps into a recess of the cavity 228 formed by the lip 236, the first wall 232 and the second wall 234, and is retained within the cavity 228b, with the lip 236 engaging a portion of the second protrusion 222b. In this manner, the bushing 164 is retentively coupled within the opening 192, at a position of operator choice. In an assembled position of the bushing 164 with the opening 192 (i.e. when the bushing 164 is inserted and positioned), the axis 218 of the bushing 164 may be coincidental with axis 206 of the opening 192. A disassembly of the bushing 164 relative to the opening 192 of the plate 160 may be envisioned by executing the aforementioned operation in reverse.

By facilitating such re-positioning, the bushings 164 may be modularly used for multiple machines with different linkage assemblies (and also different implements). Moreover, by use of the bracket assembly 112, a time required for an implement changeover, or a machine changeover, is considerably reduced when compared to situations when the entire bracket assembly 112 had to be removed for assembling an implement, such as implement 104, with a different machine. Furthermore, with use of the bushings 164, a conventional need involving the inventory and use of multiple bushings may be avoided. This is because one bushing applicable for a characteristic stick width may be unable to accommodate a different stick width from another linkage assembly (of perhaps another machine). Such a deficiency generally necessitated multiple bushing to be stored and applied appropriately to serve and accommodate different widths of different stick ends and attachment member ends. By way of the bushings 164 such a situation may be well avoided, and rather, machines or linkage assemblies with different stick widths (or arm widths) may repeatedly use the bracket assembly for coupling an implement to the sticks.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

What is claimed is:

1. A bracket assembly for coupling an implement to an arm of a machine, the bracket assembly comprising:
    a bracket including a plate with an opening having an inner wall, the inner wall including a plurality of engagement structures arranged along an axial direction of the opening, and being longitudinally spaced apart from each other; and
    a bushing adapted to be inserted into and positioned within the opening, the bushing including a cylindrical portion with an outer surface, an end, and a plurality of mating structures arranged on the outer surface and longitudinally spaced apart from each other along an axial direction of the cylindrical portion,
    wherein an engagement between the plurality of engagement structures and the plurality of mating structures facilitates multiple positions of the end relative to the plate, and
    wherein each engagement structure of the plurality of engagement structures includes a J-shaped protrusion defining a cavity to receive one mating structure of the plurality of mating structures.

2. The bracket assembly of claim 1, wherein successive engagement structures of the plurality of engagement structures define one or more inlet passages to receive the plurality of mating structures into the cavity.

3. The bracket assembly of claim 1, wherein each engagement structure includes
    a first wall and a second wall, the second wall being perpendicular to the first wall, and
    a lip extending from the second wall parallel to the first wall, and
    wherein the first wall, the second wall, and the lip together define a cavity to receive one mating structure of the plurality of mating structures.

4. The bracket assembly of claim 3, wherein the first wall is extended along a curvature of the inner wall, perpendicular to the axial direction of the opening, the second wall being defined along the axial direction of the opening.

5. The bracket assembly of claim 1, wherein each mating structure of the plurality of mating structures is a protrusion extending radially outwardly from the outer surface of the cylindrical portion.

6. The bracket assembly of claim 1, wherein the plate is a first side plate and the opening is a first opening,
the bracket further including a second side plate with a second opening,
the bracket assembly further including a pin configured to pass through each of the first opening and the second opening and couple the arm to the bracket.

7. The bracket assembly of claim 6, wherein the first opening and the second opening define a first pair of aligned openings, and the bracket further includes a second pair of aligned openings.

8. The bracket assembly of claim 1, wherein the bushing includes a flange extending radially outwardly from the end, the flange being configured to abut against the plate and restrict an axial movement of the bushing relative to the plate.

9. The bracket assembly of claim 1, wherein the cylindrical portion is configured to be inserted and positioned into the opening, along an axis of the opening, and the multiple positions of the end relative to the plate correspond to a variation of a distance between the end and the plate, measured along the axis of the opening.

10. A linkage assembly for a machine, the linkage assembly comprising:
an arm;
a bracket pivotally coupled to the arm, the bracket being configured to couple an implement to the arm, the bracket including
a base structure configured to couple to the implement; and
a plate with an opening having an inner wall, the inner wall including a plurality of engagement structures arranged along an axial direction of the opening, and being longitudinally spaced apart from each other;
a bushing adapted to be inserted into and positioned within the opening, the bushing including a cylindrical portion with an outer surface, an end, and a plurality of mating structures arranged on the outer surface and longitudinally spaced apart from each other along an axial direction of the cylindrical portion, wherein an engagement between the plurality of engagement structures and the plurality of mating structures facilitates multiple positions of the end relative to the plate; and
a pin coupling the arm with the bracket and inserted through the opening,
wherein each engagement structure of the plurality of engagement structures includes
a first wall and a second wall, the second wall being perpendicular to the first wall, and
a lip extending from the second wall parallel to the first wall, and
wherein the first wall, the second wall, and the lip together define a cavity to receive one mating structure of the plurality of mating structures.

11. The linkage assembly of claim 10, wherein each engagement structure includes a J-shaped protrusion defining a cavity to receive one mating structure of the plurality of mating structures.

12. The linkage assembly of claim 11, wherein successive engagement structures of the plurality of engagement structures define one or more inlet passages to receive the plurality of mating structures into the cavity.

13. The linkage assembly of claim 10, wherein the first wall is extended along a curvature of the inner wall, perpendicular to the axial direction of the opening, the second wall being defined along the axial direction of the opening.

14. The linkage assembly of claim 10, wherein each mating structure of the plurality of mating structures is a protrusion extending radially outwardly from the outer surface of the cylindrical portion.

15. The linkage assembly of claim 10, wherein the plate is a first side plate and the opening is a first opening,
the bracket further including a second side plate with a second opening,
the pin being configured to pass through each of the first opening and the second opening and couple the arm to the bracket.

16. The linkage assembly of claim 15, wherein the first opening and the second opening define a first pair of aligned openings, the bracket further including a second pair of aligned openings.

17. The linkage assembly of claim 10, wherein the bushing includes a flange extending radially outwardly from the end, the flange being configured to abut against the plate and restrict an axial movement of the bushing relative to the plate.

18. The linkage assembly of claim 10, wherein the cylindrical portion is configured to be inserted and positioned into the opening, along an axis of the opening, and the multiple positions of the end relative to the plate correspond to a variation of a distance between the end and the plate, measured along the axis of the opening.

19. A bracket assembly for coupling an implement to an arm of a machine, the bracket assembly comprising:
a bracket including a plate with an opening having an inner wall, the inner wall including a plurality of engagement structures arranged along an axial direction of the opening, and being longitudinally spaced apart from each other; and
a bushing adapted to be inserted into and positioned within the opening, the bushing including a cylindrical portion with an outer surface, an end, and a plurality of mating structures arranged on the outer surface and longitudinally spaced apart from each other along an axial direction of the cylindrical portion,
wherein an engagement between the plurality of engagement structures and the plurality of mating structures facilitates multiple positions of the end relative to the plate,
wherein each engagement structure includes
a first wall and a second wall, the second wall being perpendicular to the first wall, and
a lip extending from the second wall parallel to the first wall, and
wherein the first wall, the second wall, and the lip together define a cavity to receive one mating structure of the plurality of mating structures.

\* \* \* \* \*